UNITED STATES PATENT OFFICE.

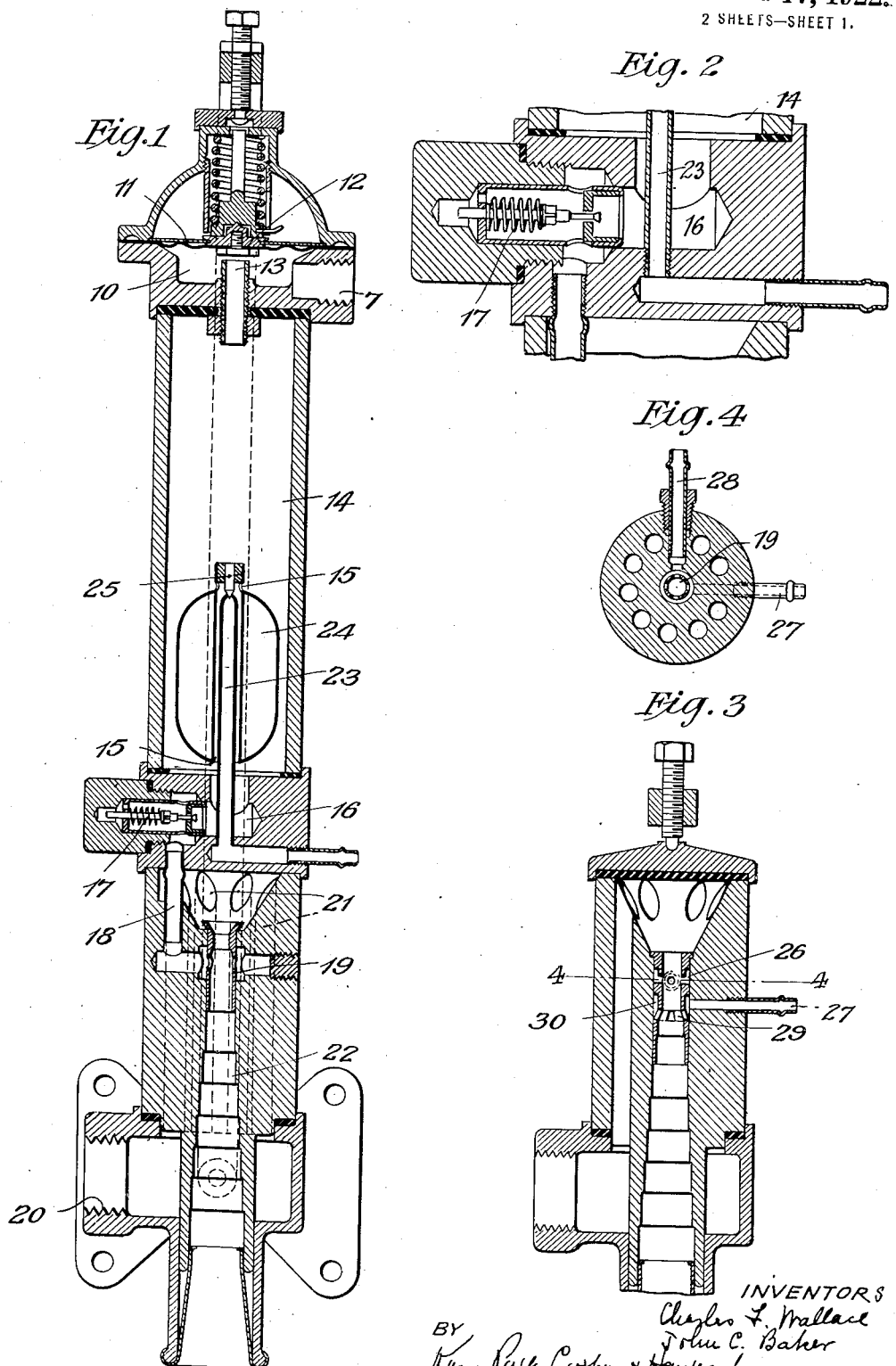

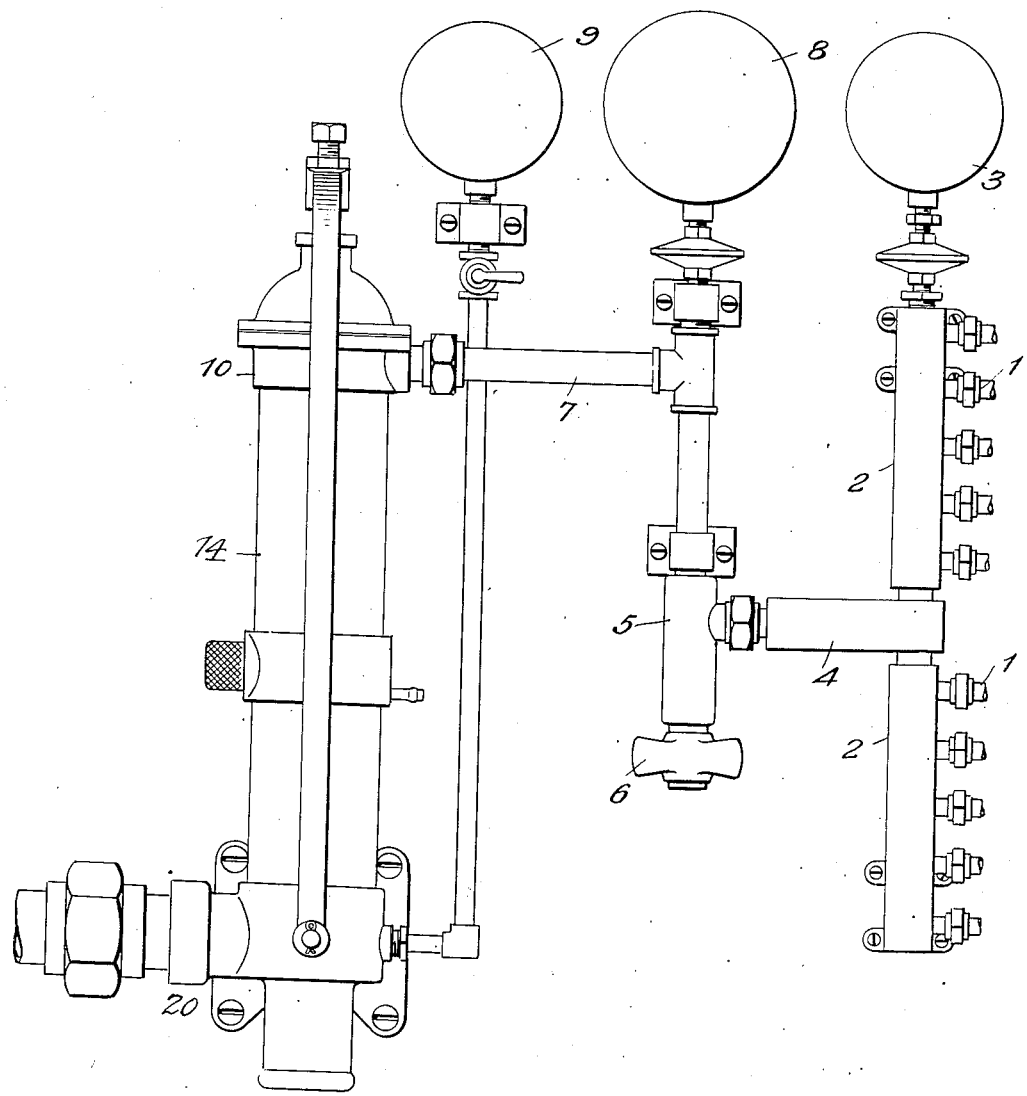

CHARLES F. WALLACE, OF WESTFIELD, AND JOHN C. BAKER, OF RIDGEFIELD PARK, NEW JERSEY, ASSIGNORS TO WALLACE & TIERNAN CO. INC., OF BELLEVILLE, NEW JERSEY, A CORPORATION OF NEW YORK.

PROCESS OF MANUFACTURING HYPOCHLORITE SOLUTIONS.

1,403,993.   Specification of Letters Patent.   Patented Jan. 17, 1922.

Application filed April 24, 1920. Serial No. 376,224.

*To all whom it may concern:*

Be it known that we, CHARLES F. WALLACE and JOHN C. BAKER, citizens of the United States, residing at Westfield, county of Union, State of New Jersey, and Ridgefield Park, county of Bergen, State of New Jersey, respectively, have invented certain new and useful improvements in processes of Manufacturing Hypochlorite Solutions, of which the following is a full, clear, and exact description.

In processes heretofore practiced for the preparation of hypochlorite solutions by the use of chlorine gas or liquid chlorine it has been customary to produce such solutions by the addition of the chlorine to the base by means of a diffuser or some form of distributing device, or by causing the chlorine to flow counter to the solution of the base through an absorption tower. These methods yield satisfactory results if the resulting solution is relatively dilute, or in other words, under 1 per cent, or, on the other hand, where a higher concentration is sought, if a sufficient amount of a strong base, such as caustic soda, be employed and, if necessary, carefully cooled during the absorption of the gas.

There are four factors which contribute to a loss of chlorine in this and similar processes; viz., the degree of alkalinity of the solution, the temperature, the concentration and the time. Solutions that are alkaline are stable and are but little affected by variations in the other three factors; in other words, the solution may be of high concentration, may be heated, or the chlorine introduced into the solution very slowly, without serious loss of chlorine. However, sufficient alkalinity for bringing about this stability can only be secured by the use of caustic soda, caustic potash or milk of lime.

By the employment of sodium or potassium carbonate, magnesium oxide, borax, basic phosphate or other mild bases, or with a strong base in sufficient amount to act upon all of the chlorine, higher concentrations of chlorine solutions than those mentioned above, may not be produced by the diffusion method without serious loss of chlorine, unless an excess of the base be used over that required to merely neutralize the hydrochloric and hypochlorous acid resulting from the action of the chlorine.

We have discovered a new method or process of producing hypochlorite solution by following which any concentration desired up to, say, 4 per cent, may be secured, with the use of any desired base whether strong or weak, and without any appreciable loss of chlorine. This method consists essentially, in effecting an aproximately instantaneous and continuous intermixture or admixture of the reacting base and the chlorine necessary for the total concentration desired in the final product.

In actual practice we accomplish this quick and continuous admixture of the chlorine and the base by passing a solution of the base, which is, preferably, soda ash, caustic soda or milk of lime, through an injector, and forcing chlorine gas into the solution under a certain pressure. This pressure, for solutions containing 0.5 per cent or less of chlorine may be atmospheric, but the chief merit of our new process resides in the fact that we may just as readily produce solutions containing more than 1 per cent of chlorine, in which event the chlorine pressure on the injector must be above atmospheric, and may be carried up to the total pressure available from the source of chlorine. By this means solutions containing as high as 5 per cent of available chlorine have been produced, and we foresee the possibility of obtaining by the same process solutions of even higher concentration. Our process, therefore, as will be readily seen, is not limited to the degree of concentration of the resulting product.

It may be remarked that by our process the mild bases may be used and no more base is required than that necessary to neutralize the acids. In fact, strong chlorine solutions may be produced without perceptible loss of chlorine, by the use of no more base than is required to neutralize the hydrochloric acid formed in the reaction,

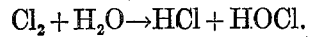
$$Cl_2 + H_2O \rightarrow HCl + HOCl.$$

Such solutions, however, are very unstable, and should be used as soon as prepared.

As to the merits and advantages of our new method, it may be stated that there is no process known to us for the production of such solutions, in which there does not result an excessive loss of chlorine. We have noted, for example, in the making of such solutions by the use of a diffuser a loss of 80 per cent of the chlorine employed in the process.

A limiting factor in the carrying out of our process when applied to the production of unstable acid solutions of high concentration is temperature. The solution of the base should preferably be cold, and in case the heat of reaction is large in amount the reaction chamber and discharge tube should be cooled artificially to keep down the losses due to the formation of chlorate or other substances. This is particularly true when the alkali is a minimum amount of a base such as caustic soda, milk of lime or magnesium oxide. With bases such as soda ash, basic phosphate or others which are hydrolytic, no appreciable amount of heat is developed by the reaction, and hence no artificial cooling device is required, it being sufficient to cool the solution of the base before starting the reaction.

From certain considerations which are particularly noted below, it is manifest that the essential feature of our new process is the control of the time factor in the introduction of the chlorine, for when this agent is added to a solution containing hypochlorous acid or neutral hypochlorites, in concentration above 1 per cent of available chlorine, it will react to produce chlorates, resulting in a loss of available chlorine. This is a relatively slow reaction and does not appreciably occur upon the instantaneous or quick mixing of the entire amounts of the reacting substances. It is evident, for example, that the introduction of chlorine into a solution by means of a diffuser, or by a counterflow, must consume a considerable time in reaching the final total concentration desired. This gives sufficient time for chlorine to be in contact with hypochlorous acid or hypochlorites to produce decomposition of the solution.

The above described process may be carried out by the use of any apparatus which is suitable for the purpose. In the annexed drawings we have shown in detail a form of apparatus which is adapted for the purpose, and for a detailed description of the process we now refer to such drawings.

Fig. 1 is a vertical central section of the main portion of the apparatus for carrying out the invention.

Fig. 2 is an enlarged section of a detail thereof including a gas check valve.

Fig. 3 is a modification of the arrangement shown in Fig. 1 in central vertical section.

Fig. 4 is a horizontal section of the same on line 4—4 of Fig. 3.

Fig. 5 is a general plan view of the complete apparatus.

Referring to the last-named figure, 1, 1, represent pipes from chlorine tanks or pumps for supplying that gas under the desired pressure to headers 2, 2. With the latter is connected a gage 3 that indicates the pressure of the gas therein. From the headers leads a pipe 4 to a vertical pipe or conduit 5, provided with a suitable valve 6, to regulate the flow of chlorine gas into conduit 5, and a lateral pipe 7 which admits the gas to the mixing apparatus. This chamber or pipe 5 is also provided with a pressure gage 8. A third gage 9 is connected with the chamber for water or base solution to indicate the pressure of liquid in the same.

The gas is admitted by the pipe 7 to a chamber 10 divided by a diaphragm 11, upon which bears a spring-actuated check valve 12, capable of nice adjustment and normally closing a port 13. This valve is not opened until the gas pressure is sufficient to raise it with the diaphragm.

The gas issuing through the port 13 enters a large chamber 14 and passes from there through passages 15 into a lower and small chamber 16, normally closed by a check-valve 17 having a light spring attached thereto, and after passing this valve it flows downward through a channel 18 to orifices in a silver tube 19 which opens into a rounded portion of said channel.

A connection to a source of water or solution of a base 20 is provided and from this extend passages, shown in dotted lines, up to orifices 21 opening into a chamber from which leads the silver tube 19 into a gradually enlarged conduit 22, the lower end of which opens into any suitable receptacle for containing the hypochlorite solution.

Water or base solution at a given and regulated pressure is caused by this means to flow down through the tube 19 which acts as an injector upon the chlorine which enters the tube through the perforations therein. The pressure of the gas, and the dimensions of the openings into the tube 19 are so determined with reference to the pressure at which the base solution is delivered to the injector that substantially the exact proportion of chlorine which the final product is to contain is intermixed with the stream of solution.

As a safety device, a tube 23 extends up into the chamber 14 and is normally closed by a valve 25 of tungsten or like material not affected by chlorine, carried by a float 24. Should water or solution from any cause or for any reason pass up into the chamber 14, this float rises and opens the valve 25, so that the gas and liquid in chamber 14 escapes through the tube 23 to the air and flooding of the chamber, with consequent access of fluid to the other parts of the apparatus is prevented.

We have found that when chlorine gas is thus intermingled in a given proportion with a stream of base solution, that it is instantly taken up by the solution in the same proportion, and that in producing the final solution there is no appreciable loss of chlorine. In other words, if it is desired to produce a solution with 4 per cent of chlorine then 4 per cent of chlorine, determined by the pressures and rates of flow, is introduced to the solution delivered to the injector.

It is not essential that the water as introduced into the apparatus actually contain the base in solution, as the latter may be introduced into the water immediately previous to the admixture of the chlorine therewith. This may be desirable in cases where it is wished to store a supply of a solution of the base, or for any other reason to make the base solution stronger than is ultimately necessary. For example, in Fig. 3 the tube 19 may pass through a small chamber 26 to which a concentrated solution of the base is passed through a tube 28 and from which it flows into the water descending through the tube 19 through a series of perforations.

Around the lower end of the tube 19 is a chamber 30 into which the chlorine gas is delivered by a pipe 27 and the lower end of the tube 19 is flaring and contains perforations through which the gas is drawn by a partial vacuum caused by the flow of water or through which it is forced by its own pressure so as to intermingle with the water and the solution of the base mixed therewith.

The above sets forth the form and nature of the apparatus which is to be employed in effecting the substantially instantaneous and continuous admixture or intermixture of the chlorine with a solution of the base, and it may obviously be modified in many respects, when and where so desired.

In the event that the base is insoluble so that a suspension or milk of the base must be used, in order to obtain a sufficiently high concentration, the process as described above may require some modification to insure that the obtaining of the entire amount of chlorine in solution before or while the base is dissolving as it reacts with the chlorine.

This may be accomplished by having the injector discharge against pressure above that of the atmosphere, into a chamber of such capacity that the reaction is complete by the time the solution has passed through the chamber and discharged through a pressure controlling device into the atmosphere. In the case of milk of lime, for example, the interval of time required to complete the reaction is from one to five seconds, if complete solution of the base is desired. When an excess of base is used, the reaction is more rapid than this so that in such case no back pressure on the injector is required.

It is well known that metals are so vigorously attacked by chlorine that it would be impossible to produce such products as herein contemplated by devices composed of materials subject to such attacks. In the apparatus hereinbefore described, therefore, such surfaces as come in contact with the chlorine are of glass, hard rubber or the like. For example, the walls of chamber 14 are of glass. The solid parts beneath are of hard rubber, and so on. This difficulty of avoiding the effects of corrosion from the chlorine has been one of the main reasons for the failure heretofore of producing these products in a practical and economical way.

Having now described our invention, what we claim is:

1. The process herein described of producing hypochlorite solutions which consists in intermingling a stream of chlorine with a stream of a solution of a base whereby instantaneous reaction occurs and the final product obtained without loss of chlorine.

2. The process herein described of producing hypochlorite solutions containing a high proportion of chlorine which consists in introducing into a stream of a solution of the base a stream of chlorine under pressure greater than atmospheric.

3. The process herein described of producing hypochlorite solutions which consists in continuously intermingling a solution of a base with a stream of water and then introducing into such stream chlorine gas.

4. The process herein described of producing hypochlorite solutions which consists in continuously associating streams of chlorine and of a solution of a base, the chlorine being in the same proportion to the solution of the base as the final product is intended to contain.

In testimony whereof we hereunto affix our signatures.

CHARLES F. WALLACE.
JOHN C. BAKER.